(12) United States Patent
Maiden

(10) Patent No.: US 7,641,790 B2
(45) Date of Patent: Jan. 5, 2010

(54) UV LED BASED WATER PURIFICATION MODULE FOR INTERMITTENTLY OPERABLE FLOW-THROUGH HYDRATION SYSTEMS

(75) Inventor: Miles Maiden, Blue Hill, ME (US)

(73) Assignee: Hydro-Photon, Inc., Blue Hill, ME (US)

( * ) Notice: Subject to any disclaimer, the term of this patent is extended or adjusted under 35 U.S.C. 154(b) by 467 days.

(21) Appl. No.: 10/528,860

(22) PCT Filed: Sep. 24, 2003

(86) PCT No.: PCT/US03/30061

§ 371 (c)(1),
(2), (4) Date: Mar. 23, 2005

(87) PCT Pub. No.: WO2004/028290

PCT Pub. Date: Apr. 8, 2004

(65) Prior Publication Data

US 2006/0163126 A1 Jul. 27, 2006

(51) Int. Cl.
*C02F 1/32* (2006.01)

(52) U.S. Cl. .................. 210/91; 210/241; 250/435; 422/186.3

(58) Field of Classification Search ......... 250/432–437; 422/186.3; 210/91, 241, 748, 87, 192
See application file for complete search history.

(56) References Cited

U.S. PATENT DOCUMENTS

| | | | |
|---|---|---|---|
| 4,762,613 A | | 8/1988 | Snowball |
| 4,849,100 A | | 7/1989 | Papandrea |
| 4,899,057 A | * | 2/1990 | Koji .................... 250/436 |
| 5,167,819 A | * | 12/1992 | Iana et al. ............. 210/474 |
| 5,230,792 A | * | 7/1993 | Sauska et al. ............ 210/97 |
| 5,780,860 A | * | 7/1998 | Gadgil et al. ......... 250/432 R |
| 5,845,504 A | | 12/1998 | LeBleu |
| 6,182,453 B1 | * | 2/2001 | Forsberg ................. 62/125 |
| 6,193,886 B1 | * | 2/2001 | Nohren, Jr. ............. 210/282 |
| 6,419,821 B1 | * | 7/2002 | Gadgil et al. ............. 210/86 |
| 6,461,520 B1 | * | 10/2002 | Engelhard et al. ........ 210/748 |
| 6,524,447 B1 | * | 2/2003 | Carmignani et al. ..... 204/158.2 |

(Continued)

FOREIGN PATENT DOCUMENTS

DE  42 28 860 A1  3/1994

(Continued)

*Primary Examiner*—Terry K Cecil
(74) *Attorney, Agent, or Firm*—Cesari and McKenna, LLP

(57) ABSTRACT

A wearable or portable intermittently operable hydration system (10) includes a purification module (22, 50) that contains one or more solid state UV devices that are positioned in the path of hydrating fluid, or water, flow through the hydration system to a mouthpiece (18). The UV LEDs are instant on devices with essentially no ramp-up required, and a sensor (20) or the opening of a push-pull valve (53) controls the turning on of the UV LEDs. The fluid flow path may run from a bladder (12) in a backpack (19) worn by the user, a sports bottle (54) worn by or carried by the user or may be through a water filtration system that a user operates via a pump. The power for the purification module may come from batteries, solar cells, fuel cells, power converted from pumping or winding action or any combination thereof.

12 Claims, 6 Drawing Sheets

U.S. PATENT DOCUMENTS 6,712,414 B2 * 3/2004 Morrow .................. 296/26.01

FOREIGN PATENT DOCUMENTS

| WO | 97/38272 | 10/1997 |
| WO | WO 00/09449 | 2/2000 |
| WO | WO 02/12127 | 2/2002 |
| WO | WO 03065032 A2 * | 8/2003 |

* cited by examiner

UV LED BASED WATER PURIFICATION MODULE FOR INTERMITTENTLY OPERABLE FLOW-THROUGH HYDRATION SYSTEMS

FIELD OF THE INVENTION

The inventive system described herein uses ultraviolet ("UV") light emitting diode (LED) technology to disinfect drinking water in intermittently operated flow-through hydration systems, such as wearable bladder bags. In such systems, water generally flows intermittently and on-demand from a bladder bag, or other "reservoir," through a tube and out into the user's mouth or, alternately, a drinking vessel.

BACKGROUND OF THE INVENTION

Currently, most UV water treatment systems use low pressure cold cathode fluorescent (CCFL) mercury vapor lamps with a primary radiative emission of 254 nanometers (2,537 angstroms). This wavelength, which falls within the short wave UV-C band, is highly germicidal.

The CCFL UV lamps can be very effective in batch UV water purification systems, such as the system described in U.S. Pat. Nos. 5,900,212 and 6,110,424. However, the CCLF lamps are not well suited for wearable hydration systems. The lamps and their thermally insulating sleeves must be made from high quality, optical grade quartz, and thus, the CCFL UV lamp assemblies tend to be both costly and fragile. In addition, the CCFL UV lamps require high voltage AC power, and the circuitry needed to deliver this power is complex and relatively expensive, particularly if the input is from a DC source such as a battery.

The lamps also require a significant "warm-up" period during which lamp output "ramps up" from zero to full power. During this "ramp-up" period, any water flowing past a CCFL UV lamp will not have predictable or uniform UV exposure. As a result, the efficacy of the treatment of water in such a flow-through system, from a micro-biological standpoint, becomes unpredictable and unreliable. For this reason, safety dictates that CCFL UV lamps be allowed to "ramp-up" to a steady-state output before water flow past the lamp is permitted. Achieving this steady-state output may take up to several minutes.

In a wearable flow-through hydration system or other intermittently operated on-demand flow-through systems, water consumption is not only intermittent but sudden and unpredictable. Accordingly, the CCFL UV lamps must, for safe operation, have been "ramped-up" to a steady state output before the water is allowed to flow past. The user must thus either keep the CCFL UV lamp on all the time or turn on the lamp for up to several minutes prior to each use, in order to allow for the "ramp-up" to steady state output. Neither of these scenarios is particularly desirable. In the first, the lamp must be kept on all the time and consumption of limited battery power quickly becomes a problem. In the second, the lamp must be turned on minutes before taking each drink and there is an obvious inconvenience.

SUMMARY OF THE INVENTION

The invention is a wearable or portable intermittently operable hydration system in which a water purification module containing one or more solid state UV devices, such as UV LEDs, is positioned in the path of the flow of the hydrating fluid, such as water, from a container or reservoir through a tube or straw to a mouthpiece or other orifice. The purification module provides a path for the water past the one or more UV LEDs, which are turned on to subject the water to sufficient UV radiation to purify the water. The UV LEDs are "instant on" devices with essentially no ramp-up, and a sensor or switch situated in the flow path signals the UV LEDs to turn on whenever the user initiates water flow through the path.

The UV LEDs are DC devices, and thus, require simpler, lower cost drive and control circuitry, than is required to operate CCFL lamps. Further, the UV LEDs are solid state devices and are thus less fragile than the CCFL lamps. Accordingly, the UV LEDs are well suited for intermittently operated wearable or portable flow-through hydration devices, such as wearable bladders, user-carried or worn sports water bottles, and so forth.

The DC power for the UV LEDs may be supplied by batteries, fuel cells and/or by solar cells, that is, photovoltaic panels, and the batteries and fuel cells and/or capacitors may be charged by solar cells. Further, a backpack that holds the system may be made from flexible photovoltaic material or material that supports or incorporates photovoltaic panels, and thus, provide power directly to the unit. Alternatively, the UV LEDs may be powered by windup or crank-type dynamos in addition to or in place of the batteries, cells and, in a black-out condition, grid power.

The purification module and associated water flow sensor may instead be positioned in a drinking straw, and thus, be used to purify water flowing through the straw from any type of water bottle, canteen and so forth, carried by the user. The purification module may additionally include a filter that removes sediment from the water. Alternatively, the purification module may be included in the tubing of a portable water filtering system, such as a pump system used by campers. The filter in such a system may then be relatively coarse, since the filter needs only to trap sediment and not microbes, which are destroyed by the purification module. Further, such a filtering system would not require use of chemicals. In addition, the pump action may be harnessed to power the UV LEDs, and batteries and the like may thus be eliminated.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
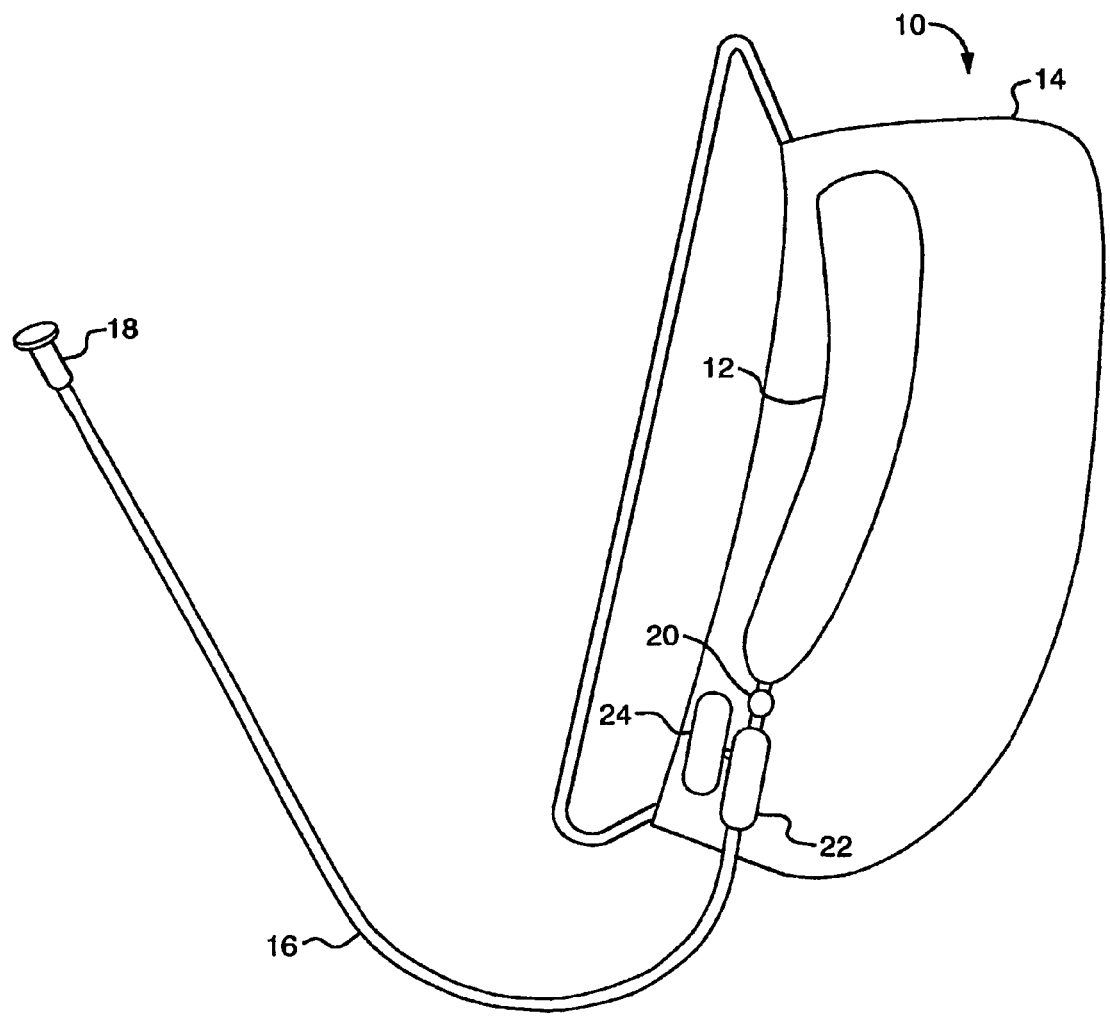
FIG. 1 is schematic representation of a wearable hydration system constructed in accordance with the current invention.

As shown in FIG. 1, a wearable flow-through hydration system 10 includes a bladder 12 that is contained in a backpack 14. The bladder supplies hydrating fluids, such as water, to a user through a tube 16 and mouthpiece 18. The tube includes a purification module 22 that ensures that the water is sufficiently irradiated by ultraviolet ("UV") light in the germicidal range. As the water flows through the module 22, the UV radiation destroys the DNA of the microbes present in the water, thereby preventing microbial reproduction, and therefore, infection. The purification module 22 is discussed in more detail below with reference to FIGS. 2-4

When a user requires water from the bladder 12, the water is drawn out of the bladder and flows past a water flow sensor 20. When the water flow sensor senses the flow, the sensor switches on the purification module 22. A power supply 24 supplies between 6 and 9 volts DC power to the purification module, and as discussed in more detail below, one or more solid state UV device, such as, UV light emitting diodes ("LEDs"), turn on to irradiate the water as the water flows through the purification module.

Figure 2:
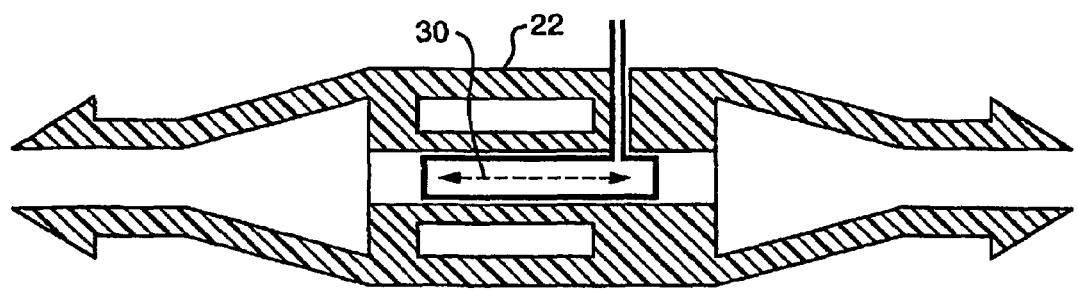
FIGS. 2-4 depict in more detail a purification module included in the system of FIG. 1.
Figure 3:
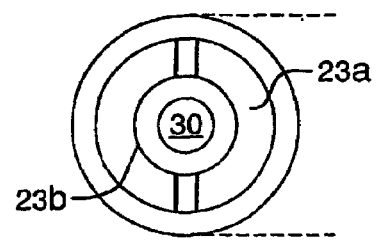
Figure 4:
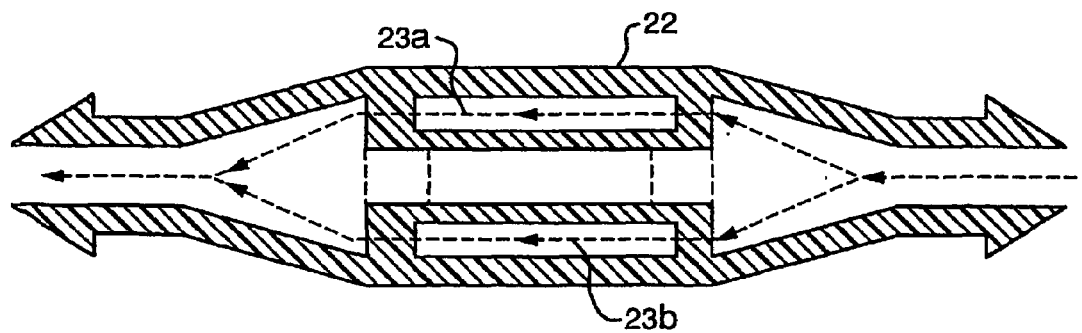

Referring now to FIGS. 2-4, the purification module 22 includes an LED unit 30 that preferably contains a plurality of UV LEDs (not shown individually). The module 22 is positioned in the tube 16 such that water flows on paths 23a and 23b largely surrounding the unit 30. The dimensions of the purification module 22 and the associated section of the tube 16 are such that water flowing past and at a maximum distance away from the UV LEDs receives energy of at least 25 mJ/cm$^2$.

As shown in the drawings, the module 22 is widened where the LED unit 30 resides, such that water flow is not impeded by having to flow around, that is, on the paths 23a and 23b on either side of, the LED unit. This prevents a backing up or other interruption of the water flow through the tube 16 to the user.

Unlike CCFL UV lamps, UV LEDs are "instant on" devices meaning that UV output reaches steady state in micro or nanoseconds. Also, unlike fragile CCFL UV lamps, UV LEDs are robust solid state devices which do not require low pressure gas mixtures that can leak and fail. In addition, UV LEDs are DC devices which require simple, low cost drive and control circuitry, as compared with the much more expensive and involved high voltage ballast circuitry of CCFL lamps.

In a wearable flow-through hydration system, where water is drawn periodically and unpredictably, UV LED based purification has a further advantage over CCFL UV systems. With "instant on" and no need for a "ramp-up" period, and thus, the LEDs can be activated only as needed, i.e., while water is being drawn. When water is not being drawn, the LEDs are off and no power is consumed.

Figure 5:
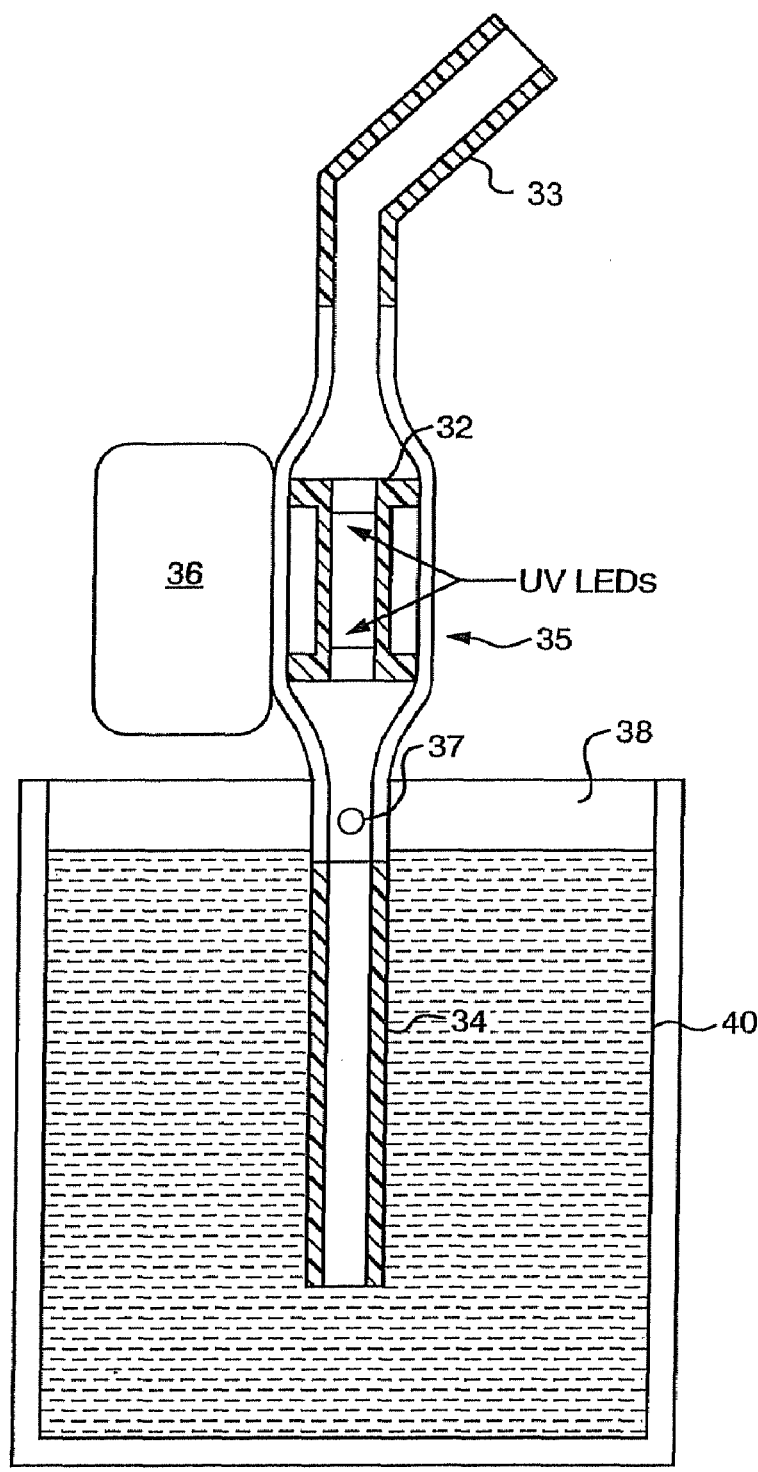
FIG. 5 is a schematic drawing of an alternative system that includes the purification module in a drinking straw.

A "drinking straw" embodiment of the invention is shown in FIG. 5. A flow-through purification module 32 is connected in line between the mouthpiece 33 and the tailpiece 34 of a drinking straw generally indicated at 35. The module is of the same construction as the module 22 of FIGS. 1-4, with an attached power supply 36. A flow sensor 37 is disposed below the module 32. In the illustration the drinking straw has been inserted through the cover 38 of a container 40 containing a liquid such as water. The user imbibes the liquid as she would through a conventional drinking straw, with the "instant on" feature of the purifier module purifying the water on-demand as the water flows through the module.

Figure 6:
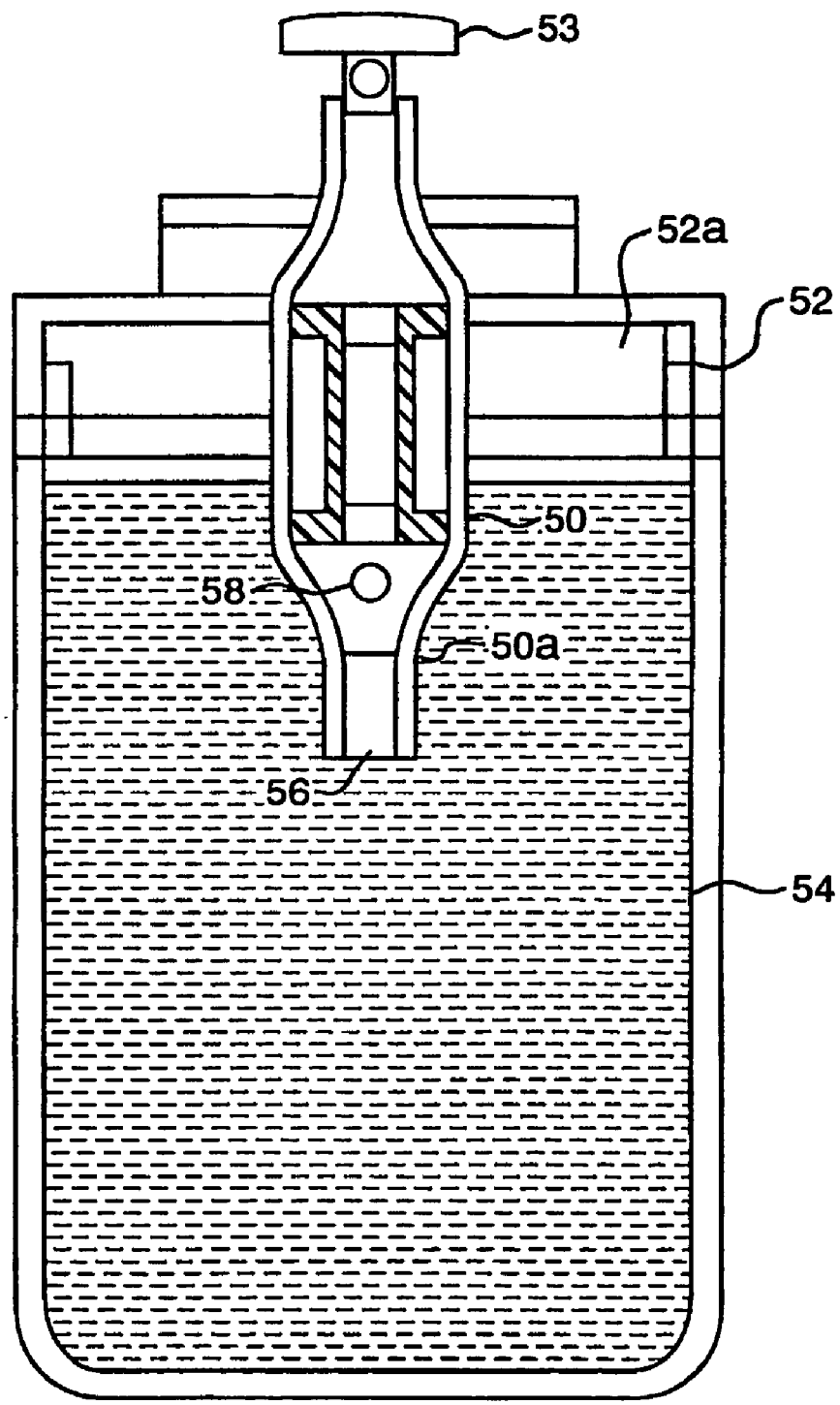
FIG. 6 is a schematic drawing of a system in which the purification module is included in a bottle top.

In FIG. 6 a purification module 50 has been combined with a bottle top 52 that contains a power supply (not shown) in a cavity 52a. The upper end of the module 52 terminates in a "push-pull" valve 53 of the type often used by cyclists, hikers, etc. The lower end of the module, which extends into the bottle 54 to which the top 52 is attached, may carry an optional filter 56 for removal of particles entrained in the water entering the module 50. The sensor 58 may be eliminated, and the push-pull operation of the valve 53 may instead be used to control the turning on of the UV LEDs, with the pulling or opening of the valve turning on the purification module.

Figure 7:
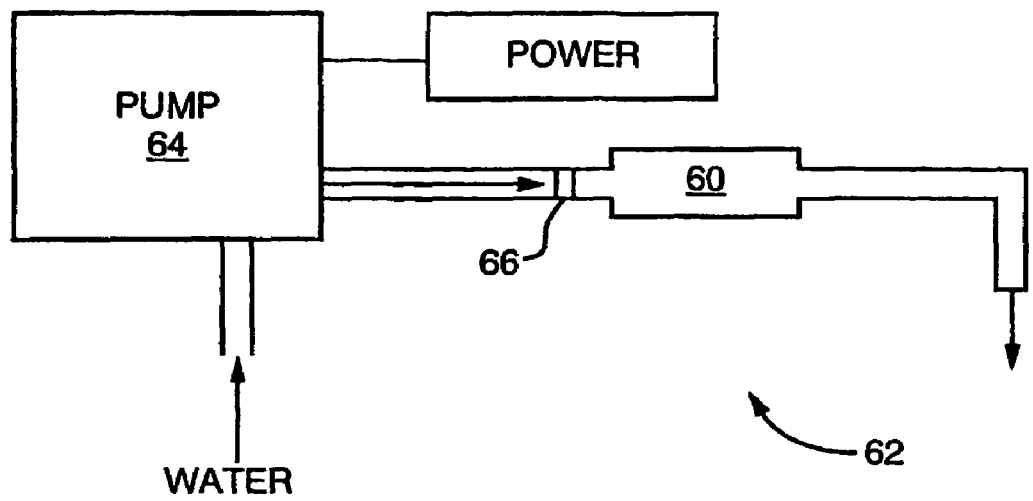
FIG. 7 is a functional block diagram of a portable water filtration system constructed in accordance with the invention.

FIG. 7 depicts a purification module 60 in use in a portable water filtration system 62, such as those used by campers. The purification unit destroys microbes in the water that is pumped through the system via pump 64, while one or more filters 66 remove sediments from the water. The pump action may also provide power to the UV LEDs through the power supply 68, which operates in a known manner to convert pumping action to DC power. In such a filtration system, a water flow sensor is not required, since the power supply utilizes pumping action and thus does not provide power to the UV LEDs unless the pump is operated to draw water through the system. The one or more filters need not be as fine as those used in conventional water filtration systems, since the filters need not trap the microbes, which are instead destroyed by the UV radiation. Further, the water filtration system does not require the chemicals used in conventional filtration systems.

The power supplies discussed above may include conventional batteries or solar cells, that is, photovotaic panels. Alternatively, the power supply may include batteries, fuel cells or capacitors that are charged by solar cells, and/or windup or crank-type dynamos. Further, the backpack 14 (FIG. 1) that holds the system may be made from flexible photovoltaic material or made of material that supports or incorporates the photovoltaic panels, and thus, provide power directly to the unit. Similarly, a carrier (not shown) for the bottle 54 (FIG. 6) may be made from, support or incorporate photovoltaic material. In addition or instead, the bottle top 52 may be made relatively inflexible photovoltaic material or support one or more photovoltaic panels. Alternatively, the UV LEDs may be powered by windup or crank-type dynamos (not shown) in addition to or in place of the batteries, cells and, in a black-out condition, grid power.

Figure 8:
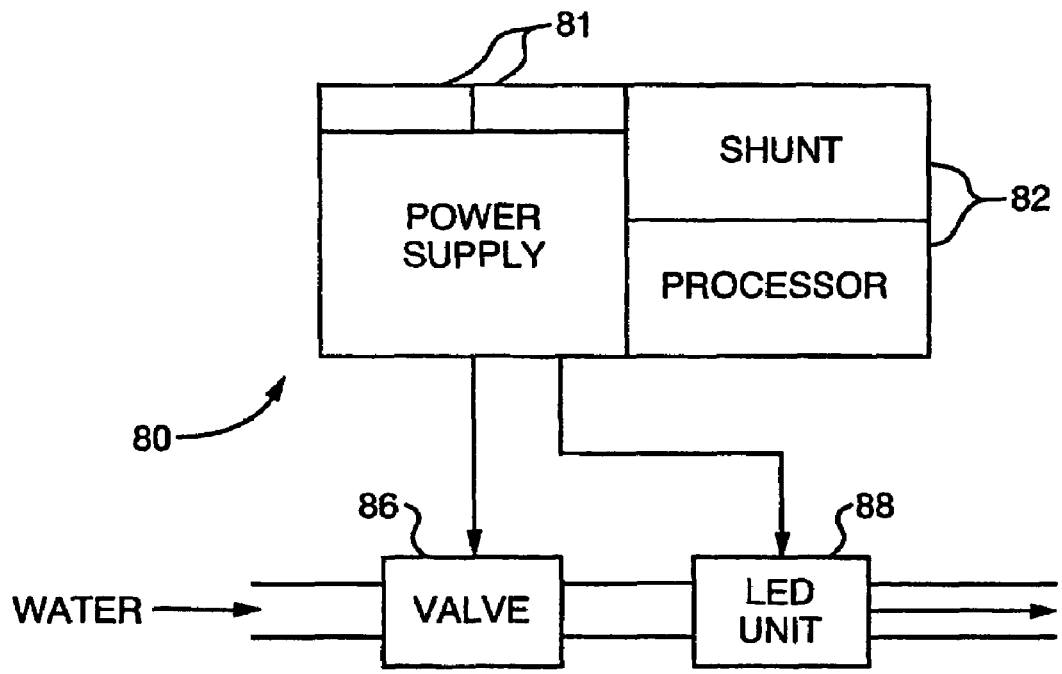
FIG. 8 is a functional block diagram that depicts in more detail a power supply that may be included in the system of FIG. 1.

Referring now to FIG. 8, when solar cells are used, the power supply 80 preferably includes a current shunt 82 that is coupled to a microcontroller 84, for measuring the current supplied to the UV LEDs and calculating the UV dose, which is proportional to the current. When there are fluctuations in solar energy, such as when a cloud covers the sun, the microcontroller may impede the flow of the water, to provide longer periods of exposure to the UV radiation by controlling the amount by which a valve 86 opens to allow water flow past the UV LEDs in unit 88. The microcontroller may instead prevent the water from flowing through the purification module until sufficient current can be supplied. As appropriate, the unit may be switched from, for example, solar power to backup battery power at appropriate times by the microcontroller and/or the user.

Figure 9:
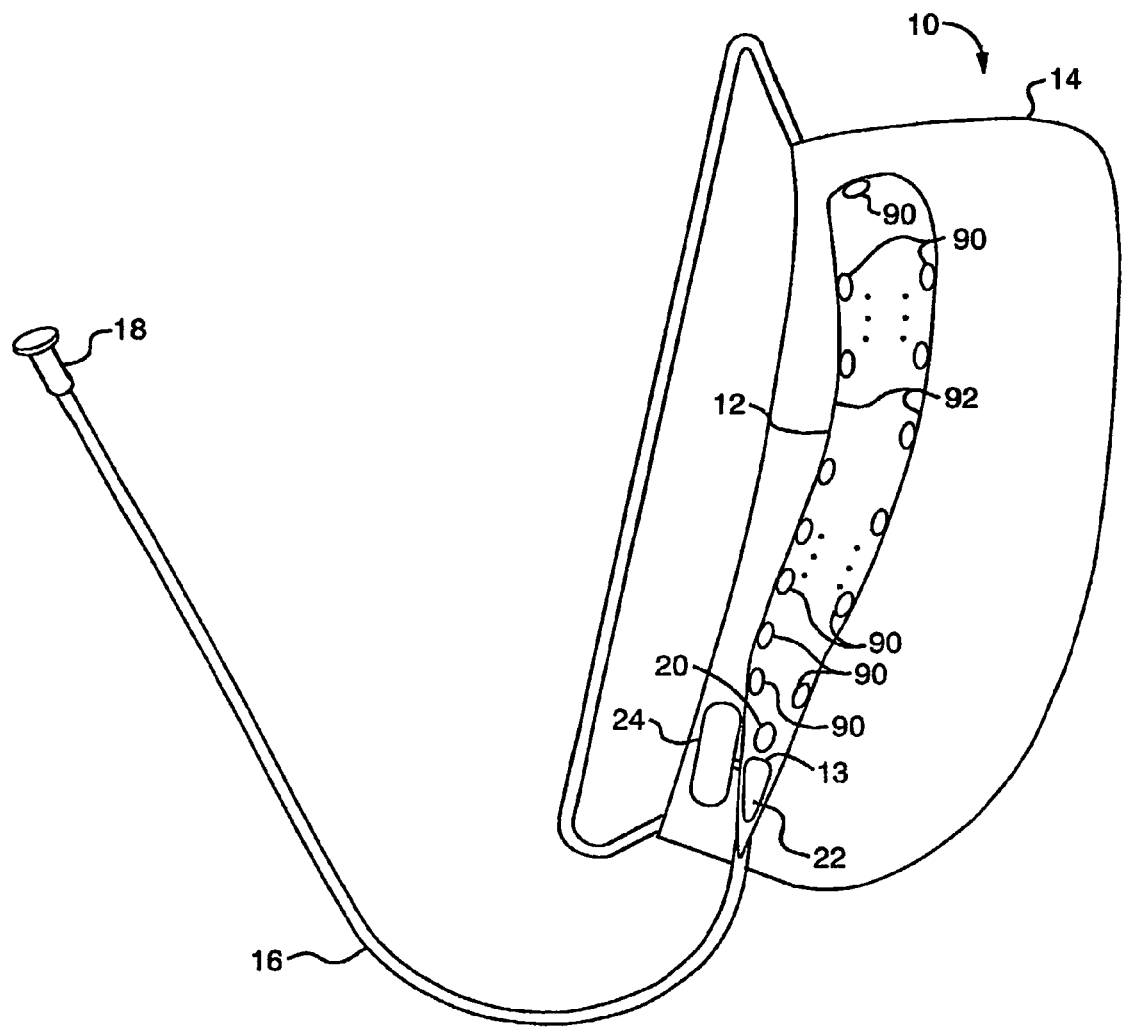
FIG. 9 is a schematic drawing of an alternative to the system depicted in FIG. 1.

As depicted in FIG. 9, the LED unit 22 may instead be positioned in the narrowing channel 13 that connects the bladder 12 to the tubing 16, with the UV LEDs turning on when water flows through the channel. Alternatively or in addition, UV LEDs 90 may be positioned facing inwardly in the walls 92 of the bladder or in the area proximate to the channel 13 to supply UV radiation to the water held in the bladder. The UV LEDs in the walls may, for example, be turned on when associated solar cells have stored sufficient energy, as a precaution against changing environmental conditions that might otherwise disrupt the power to the UV LEDs. As appropriate, the treated water may then flow through the purification module as discussed above and be subject to further UV radiation, assuming the solar cells are sufficiently charged. Alternatively, the water may be diverted around the unit or flow through the unit without further treatment. A similar arrangement and operation of the wall-mounted UV LEDs may be used in the water bottle 54 depicted in FIG. 6.

In the embodiments described above, the water flow sensors may be replaced with user-activated switches that a user turns on to activate the UV LEDs in the LED unit 30 when, for example, the user desires to take a drink. Further, automatic or user-activated switches may be included to actuate the UV LEDs 90 in the walls of the containers at desired times, such as when sufficient solar power is available or it is convenient for the user to operate a dynamo, and so forth.

In summary, the UV LED purification system described above has numerous advantages. The UV LED purification system is less costly, more robust, less complicated, more convenient, and less power-consuming. It also has the potential to be smaller and lighter than CCFL technology. Further, the UV LED purification system is particularly well suited for intermittent on-demand use. Accordingly, the system is well suited for use in wearable or portable hydration devices.

What is claimed is:

1. A portable hydrating fluid purification module, comprising:
    an ingress configured to receive hydrating fluid from a fluid source;
    an egress configured as a push-pull valve mouthpiece to direct hydrating fluid directly to a user;
    a flow path from the ingress to the egress defined by a flow path wall, the flow path arranged to allow the hydrating fluid to flow at a drinkable rate;
    one or more solid state ultraviolet (UV) devices to provide UV radiation in a germicidal range, the UV devices embedded within the flow path wall and arranged with the flow path such that hydrating fluid that flows past the UV devices at the drinkable rate is purified by the UV radiation;
    means for turning on the UV devices in response to the opening of the push-pull valve mouthpiece; and
    means for turning off the UV devices in response to the closing of the push-pull valve mouthpiece.

2. The module as in claim 1, wherein the UV devices are surrounded by the flow path wall, the flow path wall being UV permeable between the UV devices and the flow path.

3. The module as in claim 1, wherein the UV devices are embedded within a protruding portion of the flow path wall.

4. The module as in claim 3, wherein the protruding portion divides the flow path into at least two partial flow channels for the hydrating fluid to flow past the UV devices.

5. The module as in claim 3, wherein the protruding portion is centered within the flow path.

6. The module as in claim 1, wherein the purification module is widened where the UV devices are embedded within the flow path wall to maintain the drinkable rate unimpeded through the module.

7. The module as in claim 1, further comprising:
    a power supply to supply power to the UV devices.

8. The module as in claim 7, wherein the power supply is selected from a group consisting of: batteries, fuel cells, capacitors, solar cells, and windup or crank-type dynamos.

9. The module as in claim 1, wherein the module is embodied as a cap to a fluid container.

10. The module as in claim 1, wherein the fluid source is a bottle.

11. The module as in claim 1, wherein the hydrating fluid is water.

12. The module as in claim 1, wherein the flow path and UV devices are arranged to provide UV radiation of at least 25 mJ/cm$^2$ to all of the hydrating fluid flowing past the UV devices.

\* \* \* \* \*